United States Patent
Sawada et al.

(10) Patent No.: US 12,400,112 B2
(45) Date of Patent: Aug. 26, 2025

(54) EFFICIENT METHOD FOR VLSI IMPLEMENTATION OF USEFUL NEURAL NETWORK ACTIVATION FUNCTIONS

(71) Applicant: INTERNATIONAL BUSINESS MACHINES CORPORATION, Armonk, NY (US)

(72) Inventors: Jun Sawada, Austin, TX (US); Myron D. Flickner, San Jose, CA (US); Andrew Stephen Cassidy, Austin, TX (US); John Vernon Arthur, San Jose, CA (US); Pallab Datta, San Jose, CA (US); Dharmendra S. Modha, San Jose, CA (US); Steven Kyle Esser, San Jose, CA (US); Brian Seisho Taba, Cupertino, CA (US); Jennifer Klamo, San Jose, CA (US); Rathinakumar Appuswamy, San Jose, CA (US); Filipp Akopyan, New Windsor, NY (US); Carlos Ortega Otero, Los Angeles, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 996 days.

(21) Appl. No.: 17/115,285

(22) Filed: Dec. 8, 2020

(65) Prior Publication Data
US 2022/0180177 A1    Jun. 9, 2022

(51) Int. Cl.
*G06N 3/08* (2023.01)
*G06N 3/04* (2023.01)
(Continued)

(52) U.S. Cl.
CPC .............. *G06N 3/08* (2013.01); *G06N 3/04* (2013.01); *G06N 3/063* (2013.01); *G06N 5/04* (2013.01)

(58) Field of Classification Search
CPC ............ G06N 3/08; G06N 3/04; G06N 3/063; G06N 5/04
See application file for complete search history.

(56) References Cited

U.S. PATENT DOCUMENTS 10,037,306 B2    7/2018  Lin et al.
10,127,494 B1 *  11/2018  Cantin .................. G06N 3/065
(Continued)

FOREIGN PATENT DOCUMENTS

CN    109643327 A    4/2019
CN    109754063 A    5/2019
(Continued)

OTHER PUBLICATIONS

Ortega-Zamorano et al., "High precision FPGA implementation of neural network activation functions," 2014 IEEE symposium on intelligent embedded systems (IES), pp. 55-60.
(Continued)

*Primary Examiner* — Kamran Afshar
*Assistant Examiner* — Brian J Hales
(74) *Attorney, Agent, or Firm* — Erik A. Huestis; Katherine L. Baker; Foley Hoag LLP

(57) ABSTRACT

A neural inference chip is provided, including at least one neural inference core. The at least one neural inference core is adapted to apply a plurality of synaptic weights to a plurality of input activations to produce a plurality of intermediate outputs. The at least one neural inference core comprises a plurality of activation units configured to receive the plurality of intermediate outputs and produce a plurality of activations. Each of the plurality of activation (Continued)

units is configured to apply a configurable activation function to its input. The configurable activation function has at least a re-ranging term and a scaling term, the re-ranging term determining the range of the activations and the scaling term determining the scale of the activations. Each of the plurality of activations units is configured to obtain the re-ranging term and the scaling term from one or more look up tables.

17 Claims, 14 Drawing Sheets

(51) Int. Cl.
*G06N 3/063* (2023.01)
*G06N 5/04* (2023.01)

(56) References Cited

U.S. PATENT DOCUMENTS

| | | | | |
|---|---|---|---|---|
| 11,270,187 | B2* | 3/2022 | Choi | G06N 3/063 |
| 2017/0102921 | A1* | 4/2017 | Henry | G06N 3/063 |
| 2018/0060278 | A1* | 3/2018 | Lin | G06N 3/048 |
| 2019/0147323 | A1 | 5/2019 | Li et al. | |
| 2019/0385048 | A1 | 12/2019 | Cassidy et al. | |
| 2021/0157549 | A1* | 5/2021 | Elmer | G06N 3/063 |
| 2021/0303977 | A1* | 9/2021 | Sun | G06N 3/063 |

FOREIGN PATENT DOCUMENTS

| | | |
|---|---|---|
| CN | 109816105 A | 5/2019 |
| CN | 110770762 A | 2/2020 |
| CN | 111226233 A | 6/2020 |
| JP | 2020-004398 A | 1/2020 |
| KR | 2019/0051755 A | 5/2019 |

OTHER PUBLICATIONS

Li et al., "An Efficient Hardware Architecture for Activation Function in Deep Learning Processor," 2018 IEEE 3rd International Conference on Image, Vision and Computing (ICIVC), pp. 911-918.

Search and Examination Report for United Kingdom Application No. GB2116839.8 dated Aug. 31, 2022.

United Kingdom Search Report for Application No. GB2116839.8 dated Nov. 2, 2023.

The State Intellectual Property Office of People's Republic of China, "First Office Action", Mar. 3, 2025, 21 Pages, CN Application No. 202111438045.3.

Abdelouahab et al., "PhD Forum: Why TanH can be a Hardware Friendly Activation Function for CNNs", HAL Id: hal-01654697 https://hal.archives-ouvertes.fr/hal-01654697, Dec. 4, 2017, 04 Pages.

Abdelsalam et al., "Accurate and Efficient Hyperbolic Tangent Activation Function on FPGA using the DCT Interpolation Filter", Computer and Software Engineering Department Polytechnique Montreal, Sep. 25, 2016, 08 Pages.

Armato et al., "Low-error digital hardware implementation of artificial neuron activation functions and their derivative", Microprocessors and Microsystems, Aug. 2011, pp. 557-567, vol. 35, Issue 6.

German Patent and Trademark Office, "Office Action," Jan. 7, 2025, 11 Pages, DE Application No. 102021128932.7.

Hao Yufeng, "A General Neural Network Hardware Architecture on FPGA", Dept. of Electronic, Electrical and Systems Engineering, Nov. 6, 2017, 06 Pages.

Larkin et al., "An Efficient Hardware Architecture for a Neural Network Activation Function Generator", Centre for Digital Video Processing, Year 2006, pp. 08.

Raut et al., "A Cordic based configurable activation function for ANN applications", In: 2020 IEEE computer society annual symposium on VLSI (ISVLSI). IEEE, 2020, pp. 78-83.

Tiwari et al., "Hardware implementation of neural network with Sigmoidal activation functions using CORDIC", Microprocessors and Microsystems, Year 2015, pp. 373-381.

Zhang Lei, "Implementation of Fixed-point Neuron Models with Threshold, Ramp and Sigmoid Activation Functions", IOP Conf. Series: Materials Science and Engineering 224, Year 2017, 06 Pages, doi: 10.1088/1757-899X/224/1/012054.

Japan Patent Office, "Notice of Reasons for Refusal" Mar. 18, 2025, 08 Pages, JP Application No. 2021-188192.

* cited by examiner

EFFICIENT METHOD FOR VLSI IMPLEMENTATION OF USEFUL NEURAL NETWORK ACTIVATION FUNCTIONS

This invention was made with government support under FA8750-18-C-0015 awarded by the U.S. Air Force, Office of Scientific Research. The government has certain rights to this invention.

BACKGROUND

Embodiments of the present disclosure relate to neural network processing, and more specifically, to Very Large Scale Integration (VLSI) implementation of a sigmoid function with low precision linear interpolation.

BRIEF SUMMARY

In various embodiments, a neural inference chip is provided, including at least one neural inference core. The at least one neural inference core is adapted to apply a plurality of synaptic weights to a plurality of input activations to produce a plurality of intermediate outputs. The at least one neural inference core comprises a plurality of activation units configured to receive the plurality of intermediate outputs and produce a plurality of activations. Each of the plurality of activation units is configured to apply a configurable activation function to its input. The configurable activation function has at least a re-ranging term and a scaling term, the re-ranging term determining the range of the activations and the scaling term determining the scale of the activations. Each of the plurality of activations units is configured to obtain the re-ranging term and the scaling term from one or more look up tables.

In various embodiments, an integrated circuit is provided, including at least one neural inference core. The at least one neural inference core is adapted to apply a plurality of synaptic weights to a plurality of input activations to produce a plurality of intermediate outputs. The at least one neural inference core comprises a plurality of activation units configured to receive the plurality of intermediate outputs and produce a plurality of activations. Each of the plurality of activation units is configured to apply an activation function to its input, the activation function being boolean, trinary, linear, ReLU, shifted ReLU, ExpReLU, sigmoid, or tanh. The activation function has at least a re-ranging term and a scaling term, the re-ranging term determining the range of the activations and the scaling term determining the scale of the activations. Each of the plurality of activations units is configured to obtain the re-ranging term and the scaling term from one or more look up tables.

In various embodiments, a method is provided for computing output activations of a neural inference core. A plurality of synaptic weights is applied to a plurality of input activations to produce a plurality of intermediate outputs. The plurality of intermediate outputs is received and a plurality of activations is produced therefrom. Producing the plurality of activations comprises: applying a configurable activation function to the intermediate outputs, the configurable activation function having at least a re-ranging term and a scaling term, the re-ranging term determining the range of the activations and the scaling term determining the scale of the activations, and obtaining the re-ranging term and the scaling term from one or more look up tables.

DETAILED DESCRIPTION

Figure 1:
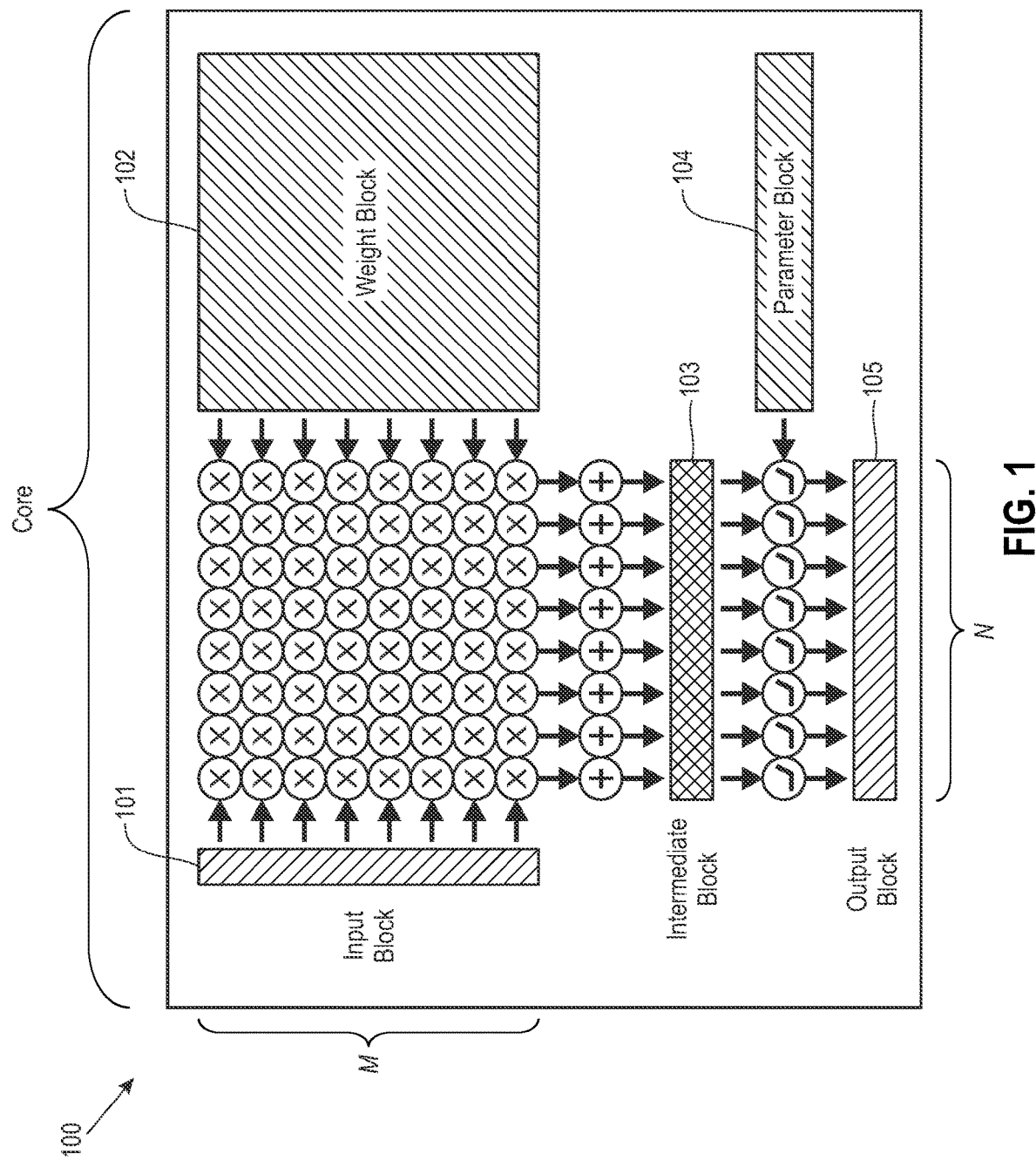
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function $\sigma$. In some embodiments, activation function a requires no additional parameters, in which case the additional dimension is unnecessary. However, in some embodiments, activation function $\sigma$ requires at least one additional parameter, which appears in dimension o.

An element of a layer's output data tensor Y can be computed as in Equation 1 where the neuron activation function $\sigma$ is configured by the vector of activation function parameters V[i,j,k,:], and the weighted sum Z[i,j,k] can be computed as in Equation 2.

$$Y[i,j,k] = \sigma(V[i,j,k,:];Z[i,j,k]) \quad \text{(Eqn. 1)}$$

$$Z[i,j,k] = \Sigma_{a=1}^{A} \Sigma_{b=1}^{B} \Sigma_{c=1}^{C} W[i,j,k,a,b,c] \cdot X[a,b,c] \quad \text{(Eqn. 2)}$$

For simplicity of notation, the weighted sum in Equation 2 may be referred to as the output, which is equivalent to using a linear activation function Y[i,j,k]=$\sigma$(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are parallel structures. Neurons in a given layer receive inputs, X with elements $x_i$ from one or more layers or other inputs. Each neuron computes its state, y∈Y based on the inputs and weights W with elements $w_i$. In various embodiments, the weighed sum of inputs is adjusted by a bias b, and then the result is passed to a nonlinearity F(•). For example, a single neuron activation may be expressed as y=F(b+$\Sigma x_i w_i$).

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

FP16 General Operation:

In various embodiments, an activation function takes FP16 (half precision or 16-bit floating point) and directly computes the activation function for INT2, INT4, and/or INT8. In various embodiments, before the conversion the FP16 partial sum input may be scaled. In various embodiments, the scaled real number z in defined as follows in Equation 3, where x is the input FP16 value:

$$z = x \times 2^{FP\_SCALE} \quad \text{(Eqn. 3)}$$

In various embodiments, if the FP16 input value to the activation function is a NaN, then the activation function produces the result as if the input is 0.0. In various embodiments, for INT2, INT4, and/or INT8 mode, the system may not flag overflow and/or underflow errors. For example, the system may never flag overflow and/or underflow errors. In various embodiments, for FP16 precision mode, the system may flag an error if scaled FP16 value overflows or underflows.

Activation Lookup Table (LUT) Definition:

In various embodiments, the activation functions may be any suitable utility functions as are known in the art. For example, the activation function may include RN(z) for rounding. In another example, the activation function may include PLA(z) for piece-wise linear approximation based on a FP16 input. In various embodiments, the PLA(z) function may use one or more added utility function, such as, for example, SAT(x, low, high) (see equation 7) and/or PLA(n) for piece-wise linear approximation based on a integer input and by using a lookup table. In various embodiments, the rounding function RN(x) may round floating-point x to the nearest integer, for example, by using the IEEE 754 rule. For example, using the IEEE 754 rule, RN(1.1)=1 and RN(1.9)=2. In various embodiments, if the value is exactly between two integers (e.g., 1.5 is between 1.0 and 2.0), the function may round to an even number. For example, RN(0.5)=0 and RN(1.5)=2. In various embodiments, if the value is exactly between two integers (e.g., 1.50 is between 1.00 and 2.00), the function may round to an odd number. For example, RN(1.5)=1 and RN(2.5)=3.

In various embodiments, the PLA(z) function takes a FP16 value z as input. The PLA(z) functions for 8-bit, 4-bit, and 2-bit implementations are shown in Equations 4-6 below:

$$PLA_8(z) = \quad \text{(Eqn. 4)}$$
$$SAT(RN(PLA(SAT(RN(z), -128, 127))), -128, 127)$$

$$PLA_4(z) = \quad \text{(Eqn. 5)}$$
$$SAT\left(RN\left(\frac{PLA(SAT(RN(z \times 16), -128, 127))}{16}\right), -8, 7\right)$$

$$PLA_2(z) = \quad \text{(Eqn. 6)}$$
$$SAT\left(RN\left(\frac{PLA(SAT(RN(z \times 64), -128, 127))}{64}\right), -2, 1\right)$$

In various embodiments, the PLA function is computed as follows. In various embodiments, the implementation can use a different order of computation (provided the result is the same). In various embodiments, for the 8-bit function, a first step includes rounding FP value z to an integer. In various embodiments, a second step includes saturating the value into range −128 and 127. In various embodiments, a third step includes using PLA to produce a fixed-point output. In various embodiments, a fourth step include rounding to the nearest integer. In various embodiments, a fifth step includes saturating the value to range −128 to 127 in case the lookup produces a value outside of the range.

In various embodiments, for the 4-bit (or 2-bit) functions, a first step includes multiplying z by 16.0 (or 64.0). In various embodiments, a second step includes rounding the FP result to an 8-bit signed integer. In various embodiments, a third step includes saturating the value into range −128 and 127. In various embodiments, a fourth step includes using PLA to produce a fixed-point output. In various embodiments, a fifth step includes using an integer PLA with lookup table to produce an integer result. In various embodiments, a sixth step includes dividing the value by 16 (or 64) precisely. In various embodiments, a seventh step includes rounding again the result to the nearest integer. In various embodiments, an eighth step includes saturating the value into range −8 to 7 (or −2 to 1).

In various embodiments, the saturation function is defined in Equation 7:

$$SAT(x, \text{low}, \text{high}) = \begin{cases} \text{low}, & x < \text{low} \\ x, & \text{low} \leq x \leq \text{high} \\ \text{high}, & \text{high} < x \end{cases} \quad \text{(Eqn. 7)}$$

In various embodiments, integer PLA(n) implements an arbitrary function by using a piece-wise linear approximation (PLA) that uses a lookup table (LUT), as defined in Equation 8. In various embodiments, input to PLA(n) is a signed 8-bit integer. In various embodiments, lookup tables for PLA(n) are rewritable and can be reprogrammed by a programmer. In various embodiments, PLA(n) is reset to the value suitable for the hyperbolic tangent (tanh) and sigmoid function. In various embodiments, the exponential ReLU function requires the programmer to set the PLA(n) to an appropriate value. In various embodiments, PLA(n) can be defined by two lookup tables LUT_C (for slope) and LUT_Y (for bias). In various embodiments, each table contains 16 entries. In various embodiments, each entry of LUT_C and LUT_Y is an 8-bit signed value. In various embodiments, each table is 128-bit width.

$$PLA(n) = \frac{LUT\_C(n[7:4] + 8)}{16} \times n[3:0] + LUT\_Y(n[7:4] + 8) \quad \text{(Eqn. 8)}$$

In various embodiments, the result from PLA(n) is a 13-bit signed fixed-point value (e.g., a 9b signed integer and 4b fraction). In various embodiments, formats of n are shown in Table 1 below.

TABLE 1

| | Input n to PLA(n) | |
|---|---|---|
| Bits | [7:4] | [3:0] |
| Width | 4 | 4 |
| Field | Index basis | Fixed slope factor |

In various embodiments, the index basis is signed. In various embodiments, the index basis has a range of −8 to 7. In various embodiments, the index basis+8 is the unsigned index into LUT_C and LUT_Y. In various embodiments, to convert it to unsigned, 8 is added to the index basis so that the index basis+8 indexes entries from 0 to 15. In various embodiments, a fixed slope factor is a value by which the looked-up slope is multiplied. In various embodiments, the fixed slope factor is an unsigned 4-bit number. In various embodiments, for LUT register definitions, see Table 2 below.

TABLE 2

Table of Activation Functions f(z)

| Function name | Description | Use LUT? |
|---|---|---|
| BOOL | Boolean | no |
| TM | Trinary | no |
| LU | Linear unit | no |
| ReLU | Rectified linear unit | no |
| shifted ReLU | Shifted rectified linear unit | no |
| exp ReLU | Exponential rectified linear unit | yes |
| sigmoid | Sigmoid | yes |
| tanh | Hyperbolic tangent | yes |

In various embodiments, the activation functions ReLU and sigmoid produce an unsigned integer as a result. In various embodiments, for all other functions, the result is a signed integer. In various embodiments, for the ISA op, see Table 3 below.

Activation Function Equations:

In various embodiments, the activation function output is specified as $y_8$, $y_4$ or $y_2$ for the 8-bit, 4-bit, or 2-bit modes.

TABLE 3

Table of Activation Function Equations

| Func. | Equation | Implementation |
|---|---|---|
| BOOL | $y_8 = y_4 = y_2 = \begin{cases} 0, & z \leq 0 \\ 1, & z > 1 \end{cases}$ | $y_8 = y_4 = y_2 = \begin{cases} 0, & x \leq 0 \\ 1, & x > 1 \end{cases}$ |
| TRI | Same as implementation | $y_8 = y_4 = y_2 = \begin{cases} -1, & z \leq -1 \\ 0, & -1 < z < 1 \\ 1, & z \geq 1 \end{cases}$ |
| LU | Same as implementation | $y_8 = \begin{cases} -128 & z < -128 \\ RN(z), & -128 \leq z \leq 127 \\ 127, & 127 < z \end{cases}$ |

TABLE 3-continued

Table of Activation Function Equations

| Func. | Equation | Implementation |
|---|---|---|
| | | $y_4 = \begin{cases} -8, & z < -8 \\ RN(z), & -8 \leq z \leq 7 \\ 7, & 7 < z \end{cases}$ |
| | | $y_2 = \begin{cases} -2, & z < -2 \\ RN(z), & -2 \leq z \leq 1 \\ 1, & 1 < z \end{cases}$ |
| ReLU | Same as implementation | $y_8 = \begin{cases} 0, & z < 0 \\ RN(z), & 0 \leq z \leq 255 \\ 255, & 255 < z \end{cases}$ |
| | | $y_4 = \begin{cases} 0, & z < 0 \\ RN(z), & 0 \leq z \leq 15 \\ 15, & 15 < z \end{cases}$ |
| | | $y_2 = \begin{cases} 0, & z < 0 \\ RN(z), & 0 \leq z \leq 3 \\ 3, & 3 < z \end{cases}$ |
| shifted ReLU | Same as implementation | $y_8 = \begin{cases} -1, & z < -1 \\ RN(z), & -1 \leq z \leq 127 \\ 127, & 127 < z \end{cases}$ |
| | | $y_4 = \begin{cases} -1, & z < -1 \\ RN(z), & -1 \leq z \leq 7 \\ 7, & 7 < z \end{cases}$ |
| | | $y_2 = \begin{cases} -1, & z < -1 \\ RN(z), & -1 \leq z \leq 1 \\ 1, & 1 < z \end{cases}$ |
| exp ReLU | $y_8 = \begin{cases} \beta \cdot (e^z - 1), & z < 0 \\ z, & 0 < z < 127 \\ 127, & 127 < z \end{cases}$ | $y_8 = \begin{cases} PLA_8(-128), & z < -128 \\ (PLA_8(z), & -128 \leq z < 0 \\ RN(z), & 0 \leq z \leq 127 \\ 127, & 127 < z \end{cases}$ |
| | | $y_4 = \begin{cases} PLA_4(-8), & z < -8 \\ PLA_4(z), & -8 \leq z < 0 \\ RN(z), & 0 \leq z \leq 7 \\ 7, & 7 < z \end{cases}$ |
| | | $y_2 = \begin{cases} PLA_2(-2), & z < -2 \\ PLA_2(z), & -2 \leq z < 0 \\ RN(z), & 0 \leq z \leq 1 \\ 1, & 1 < z \end{cases}$ |
| sigmoid | $y_8 = \dfrac{256}{1 + e^{-z/16}}$ | $y_8 = \begin{cases} PLA_8(-128) + 128, & z < -128 \\ PLA_8(z) + 128, & -128 \leq z \leq 127 \\ PLA_8(127) + 128, & 127 < z \end{cases}$ |
| | $y_4 = \dfrac{16}{1 + e^{-z}}$ | $y_4 = \begin{cases} PLA_4(-8) + 8, & z < -8 \\ PLA_4(z) + 8, & -8 \leq z \leq \dfrac{127}{16} \\ PLA_4\left(\dfrac{127}{16}\right) + 8, & \dfrac{127}{16} < z \end{cases}$ |

TABLE 3-continued

Table of Activation Function Equations

| Func. | Equation | Implementation |
|---|---|---|
| | $y_2 = \dfrac{4}{1+e^{-4Z}}$ | $y_2 = \begin{cases} PLA_2(-2)+2, & z<-2 \\ PLA_2(z)+2, & -2 \leq z \leq \dfrac{127}{64} \\ PLA_2\left(\dfrac{127}{64}\right)+2, & \dfrac{127}{64} < z \end{cases}$ |
| tanh | $y_8 = \dfrac{128(1-e^{-z/16})}{1+e^{-z/16}}$ | $y_8 = \begin{cases} PLA_8(-128), & z<-128 \\ PLA_8(z), & -128 \leq z \leq 127 \\ PLA_8(127), & 127 < z \end{cases}$ |
| | $y_4 = \dfrac{8(1-e^{-z})}{1+e^{-z}}$ | $y_4 = \begin{cases} PLA(-8), & z<-8 \\ PLA_4(z), & -8 \leq z \leq \dfrac{127}{16} \\ PLA_4\left(\dfrac{127}{16}\right), & \dfrac{127}{16} < z \end{cases}$ |
| | $y_2 = \dfrac{2(1-e^{-4z})}{1+e^{-4z}}$ | $y_2 = \begin{cases} PLA_2(-2), & z<-2 \\ PLA_2(z), & -2 \leq z \leq \dfrac{127}{64} \\ PLA_2\left(\dfrac{127}{64}\right), & \dfrac{127}{64} < z \end{cases}$ |

BOOL: In various embodiments, if z=0, then y8=y4=y2=0. In various embodiments, if z=1, then y8=y4=y2=1. In various embodiments, z is a real value and does not underflow. In various embodiments, the if the input FP16 value x is larger than 0.0, it returns 1, regardless of scaling.

LU: In various embodiments, the positive and negative values are not balanced. In various embodiments, if a balanced 2-bit LU function is required, then Shifted ReLU should be used instead.

ReLU: In various embodiments, if a steeper or more gradual slope is required, the input FP16 value may be multiplied by a constant value, or use a different FP_SCALE factor. In various embodiments, the ReLU output is an unsigned value.

Shifted ReLU: In various embodiments, the 2-bit Shifted ReLU is symmetric in positive and negative side and it can be used as a balanced LU function. In various embodiments, the Shifted ReLU output is a signed value.

Exp ReLU: In various embodiments, the default PLA implementation may be set to a tanh (z) function. In various embodiments, unless PLA is explicitly reprogrammed, the negative input z may produce the same value as tanh (z).

Sigmoid: In various embodiments, the 2-bit mode of the output function can saturate quickly at the value 3. In various embodiments, the LUT can be reprogrammed to have a smaller output range so that saturation is not an issue.

Tanh: In various embodiments, tanh is the default LUT implementation and produces unbalanced values on positive and negative side. In various embodiments, the unbalanced values can be acute on the 2-bit case, where the minimum value is −2 and the maximum value is 1. In various embodiments, the unbalanced values can be fixed by reprogramming the LUT. For example, if the 8-bit LUT is programmed to produce a balanced output in the range of −95 to 95, then each 2-bit, 4-bit, and 8-bit function output may have a balanced value.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
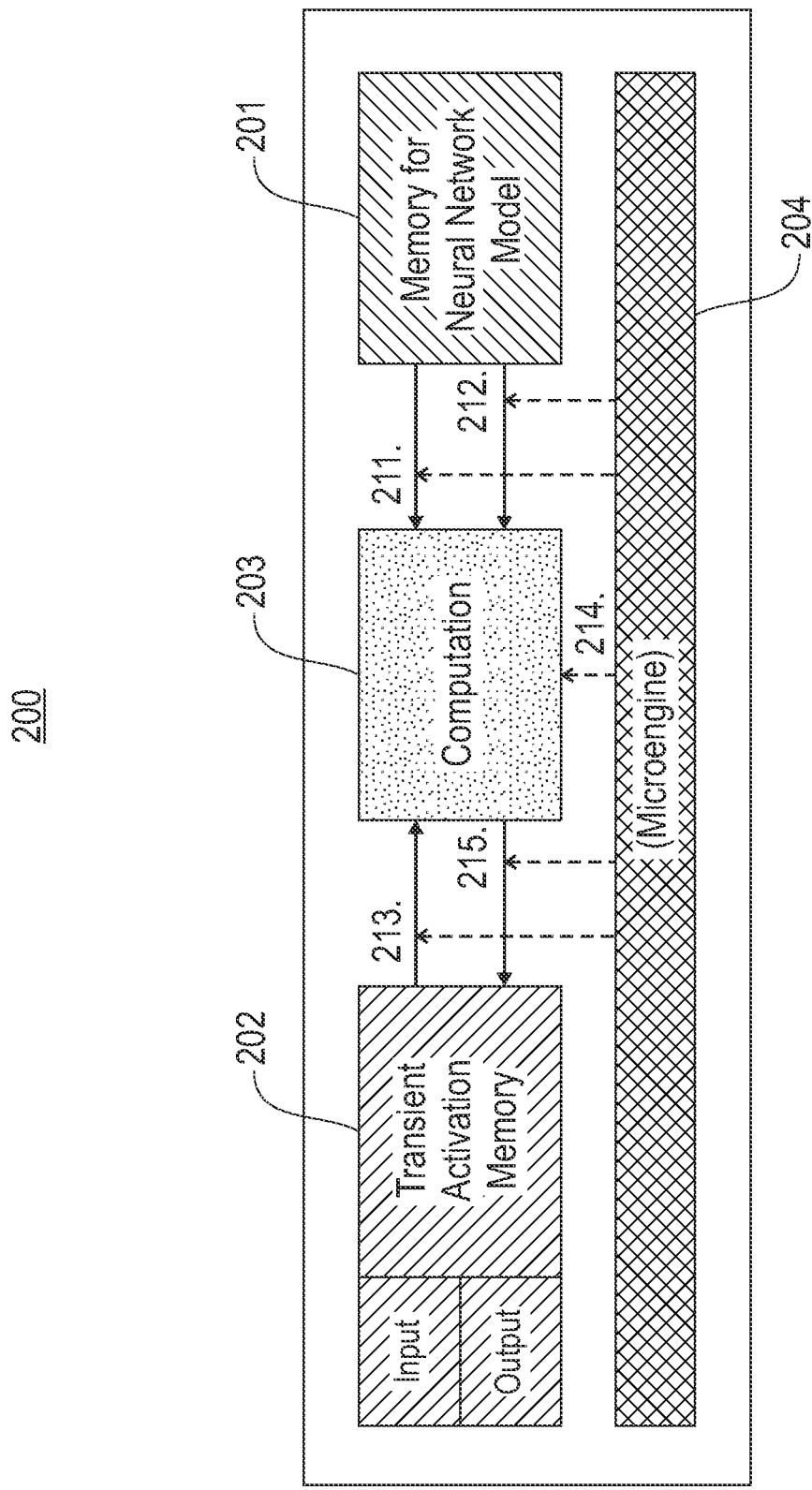
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
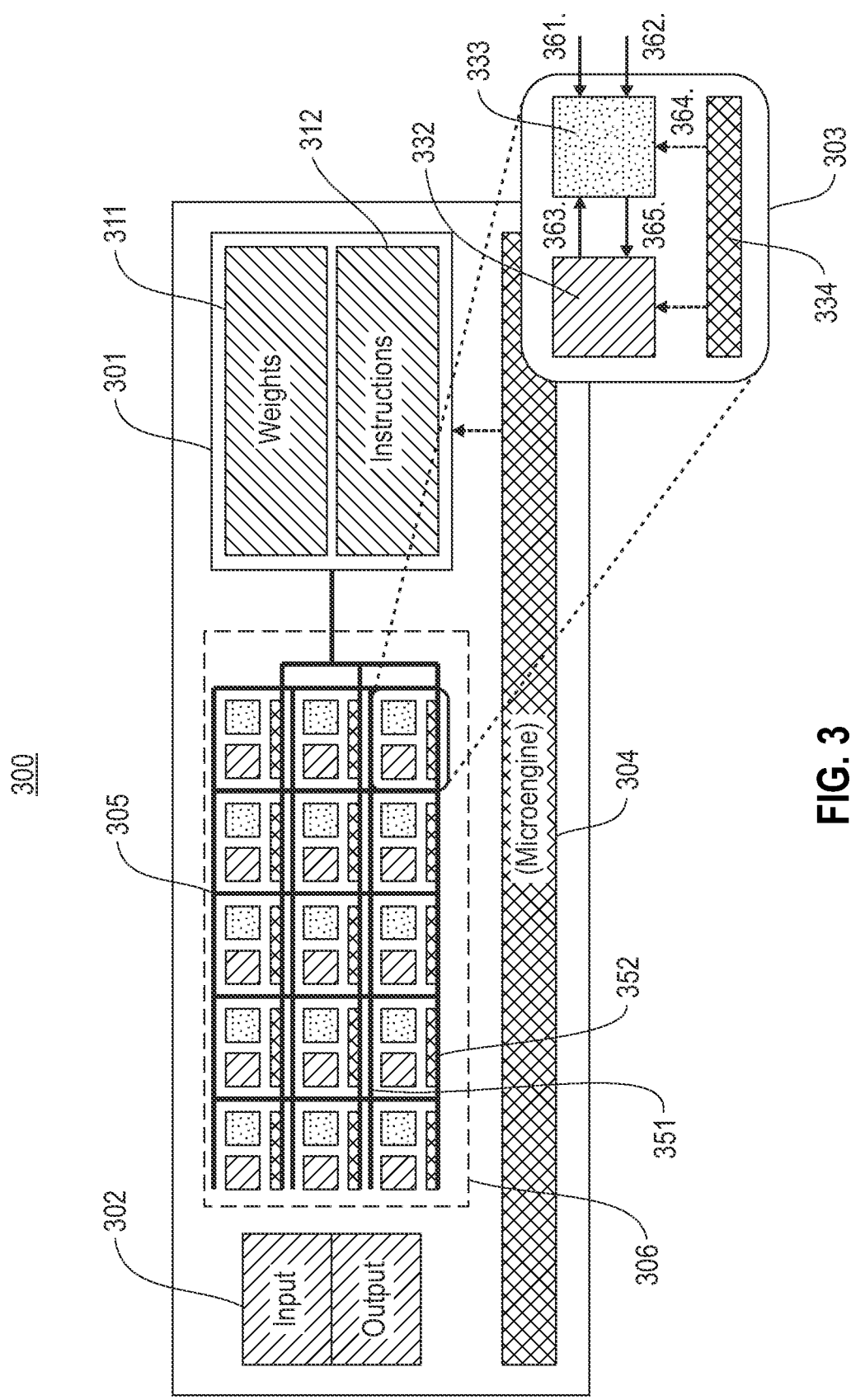
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weight portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the global microengine (chip microengine) and the local core controller (core microengine) collaboratively direct operations. In particular, at 361, compute instructions are loaded from instruction portion 312 of model memory 301 to the core controller 334 on each core 303 by global microengine 304. At 362, parameters (e.g., neural network/synaptic weights) are loaded from weight portion 311 of model memory 301 to the neural computation unit 333 on each core 303 by global microengine 304. At 363, neural network activation data are loaded from activation local activation memory 332 to neural computation unit 333 on each core 303 by local core controller 334. As noted above, the activations are provided to the neurons of the particular neural network defined by the model, and may originate from the same or another neural computation unit, or from outside the system. At 364, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 365, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) Core microcode is run on the core microengines (e.g., 334). In the case of local computation, the core microcode includes instruction(s) to execute a full, single tensor operation. For example, a convolution between a weight tensor and a data tensor. In the case of distributed computation, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
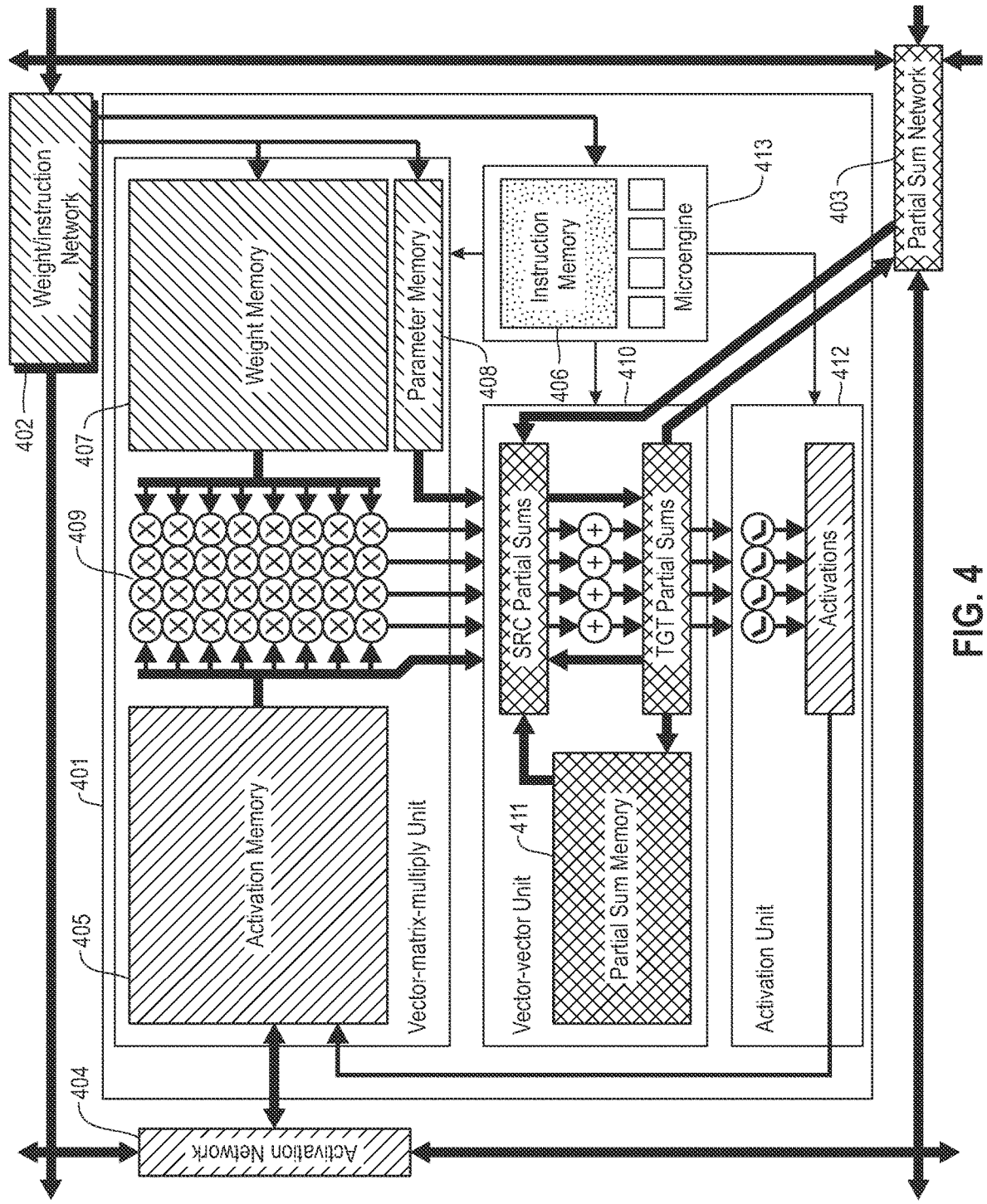
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 ... 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Accordingly, in operation, a core control microengine (e.g., 413) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, causing the vector-matrix multiply unit to compute a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 410 include Vector Matrix Multiply (VMM) unit 409, constants from parameter memory 408, partial sum memory 411, partial sum results from prior cycles (TGT partial sums); and partial sum network 403.

Targets for vector-vector unit 410 include partial sum memory 411, partial sum results for subsequent cycles (SRC partial sums), activation unit 412, and partial sum network 403.

Accordingly, a given instruction may read or write from activation memory 405, read from weight memory 407, or read or write from partial sum memory 411. Compute operations performed by the core include vector matrix multiplication by VMM unit 409, vector (partial sum) operations by vector-vector unit 410, and activation functions by activation unit 412.

Control operations include updating program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters in microengines.

In accordance with an aspect of the disclosure, data distribution from a global memory array can include a global memory array having a plurality of elements, each comprising a memory element and a buffer. Weights and instructions are provided from global array to array of cores via network. An exemplary configuration of cores 303 is discussed above with regard to FIG. 3. Memory 303 in FIG. 3 may be implemented as described in connection with global memory array.

As set out above, a many core architecture for neural inference provides a significant advantage in computing power. However, if the neural network weights and parameters are not provided to computation cores on time, the cores cannot perform any useful computation. As a result, the performance of a neural chip may be limited by the capability of delivering neural network weights and parameters to computation cores on the chip. On-chip memory greatly improves the memory bandwidth compared to typical off-chip memory such as Dynamic Random-Access Memory (DRAM) or High Bandwidth Memory (HBM). Moreover, on-chip memory is more energy-efficient than off-chip memory, leading to a more power-efficient neural inference system. In various embodiments, the on-chip memory may comprise Static Random-Access Memory (SRAM) or other embedded memories. However, delivering neural network weights to cores at the rate commensurate with the processing speed remains a challenge.

Particular efficiencies may be realized with Convolutional Neural Networks (CNN). In CNNs, the same weight matrix (sometimes referred to as a convolutional filter) is repeatedly used. To minimize the amount of on-chip memory used, it is preferable to store a given weight matrix in one place with no duplication. In order to store a large neural network, some embodiments of the on-chip memory consist of a collection of many memory elements. It will also be appreciated that the many cores are the target of the memory weights. This result in a many-to-many communication problem (many memory elements to many cores). The broadcasting of weights can create network-on-chip (NoC) congestion, and may create a number of conflicts and pipeline stalls, leading to degradation of broadcasting bandwidth.

As outlined above, in various embodiments of a neural inference chip, a grid of neural inference cores is provided to accelerate neural network inference. In various embodiments, prescheduling of instructions is provided. Neural network evaluation involves a regular pattern of computation, and so instructions can be prescheduled without any stalls in order to achieve high performance. However, it is preferred that all the neural network weights are delivered to the cores just-in-time as prescheduled. If the weight delivery network is congested and weight delivery stalls, the prescheduling of neural network evaluation fails.

The present disclosure provides for a stall-less weight delivery network-on-chip to deliver weight parameters from a grid of memory elements to a grid of computation cores. The one dimensional scheme is first shown below, and then extended to a two-dimensional grid scheme. These approaches are further extended to support different various weight distribution such as striping (where different rows of cores get different weights).

The approaches described herein work without conflict even if the time to deliver instruction to the memory element and deliver data from the memory element to computing cores varies. These approaches address instruction flow that can access any column at any order. The new schemes remove the constraint that all columns start at the same time.

In accordance with an aspect of the disclosure, each neural Inference Core can be configured with identical properties. For example, each core can include a Model Memory which stores neural network weights, parameters and microcode. An Model Network-on-Chip (MNoC) Router is included which is an interface to the MNoC, and reads the neural network model from the Model Memory and distributes across Neural Inference Core Grid. The MNoC Router also receives the network model from MNoC, and then sends it to the Weight Buffer, and Core Control. The Weight Buffer stores the neural network weight matrix before computation, while the Core Control stores microcode and neural network parameters.

Additionally, an Activation Network-on-Chip (ANoC) router is the interface to the ANoc such that when the ANoC router receives input activations, it stores them in the Activation Memory. The computation starts by the Vector Matrix Multiply (VMM) unit reading an activation vector from the Activation Memory, a weight matrix from the Weight Buffer, and multiplies them. The VMM sends its output (or Partial Sum) to Vector-Vector Unit. Next, the Vector-Vector Unit performs multiple vector-to-vector operations on partial sums, with the help of Partial Sum Memory and Partial Sum Network-on-Chip (PSNoC). Then, the PSNoC Interface sends or receives partial sums to the neighbor cores via PSNoC. Finally, the Activation Function Unit applies non-linear functions to the partial sums generating output activations, and the output activations are written back to the Activation Memory. The Core Control is responsible for sending instructions and memory addresses to all the components in the core, directing the entire operation. Accordingly, each core has the same memory burden, and no single core is required to store the entire network weights—instead the memory can be broadcast across the cores.

In accordance with an aspect of the disclosure, the system operates by delivering the input activation through the Activation NoC, and storing them in the Activation Memory of target cores. The Neural Inference Core Grid distributes the neural network model through MNoC where: the source core reads the neural network model data from the Model Memory, distributes the model through MNoC to all other cores; and the destination core receives the model and store it in Weight Buffer, Core Control and other buffers.

Each core computes the neural network with the input activation by reading the input activation vector from the Activation Memory, and weight matrix from Weight Buffer. The VMM multiplies activation vector and a weight matrix, and the V-V Unit performs various vector-to-vector operations on the partial sum output from VMM. The Activation Function Unit applies non-linear functions on the partial sum, generating output activations, and the output activations are written back to the Activation Memory. This can be repeated until the entire neural network is evaluated, and the output activations can be sent to the outside through ANoC.

The Activation Function Unit applies non-linear (e.g. sigmoid) functions to the partial sums (which are, in principle, the summation of the product of input activations and neural network weights) thereby creating output activations and stores them in the Activation Memory. The output activations are in the same vector format of, for example, 32-elements, so that VMM can read it back to use it for the computation of the next layer.

In an exemplary embodiment of the present disclosure, the non-linear function can be a sigmoid function with low precision linear interpolation. Implementation of the sigmoid function can include use of two Look Up Tables (LUT), e.g., a yLUT and cLUT. The yLUT can store magnitudes and the cLUT can store coefficients, and each can include sixteen 4-bit entries. An exemplary sigmoid function is provided below as Equations 3-6.

$$y = \text{sigmoid}(x) = \frac{s\left(INT\left(\frac{128.0 \times x}{2e}\right)\right)}{256.0}. \quad \text{Equation 3}$$

Where the values for s(i) are as provided in Equations 4-5 below:

$$s(i)=0 \text{ if } i<-128 \quad \text{Equation 4.}$$

$$s(i)=256 \text{ if } 128 \leq i \quad \text{Equation 5.}$$

And the extrapolation function is provided in Equation 6 below:

$$s(i) = yLUT\left(\frac{i-128}{16}\right) + cLUT\left(\frac{i-128}{16}\right) \times \frac{i \% 16}{4} \quad \text{Equation 6}$$
$$\text{if } -128 \leq i < 128.$$

Figure 5:
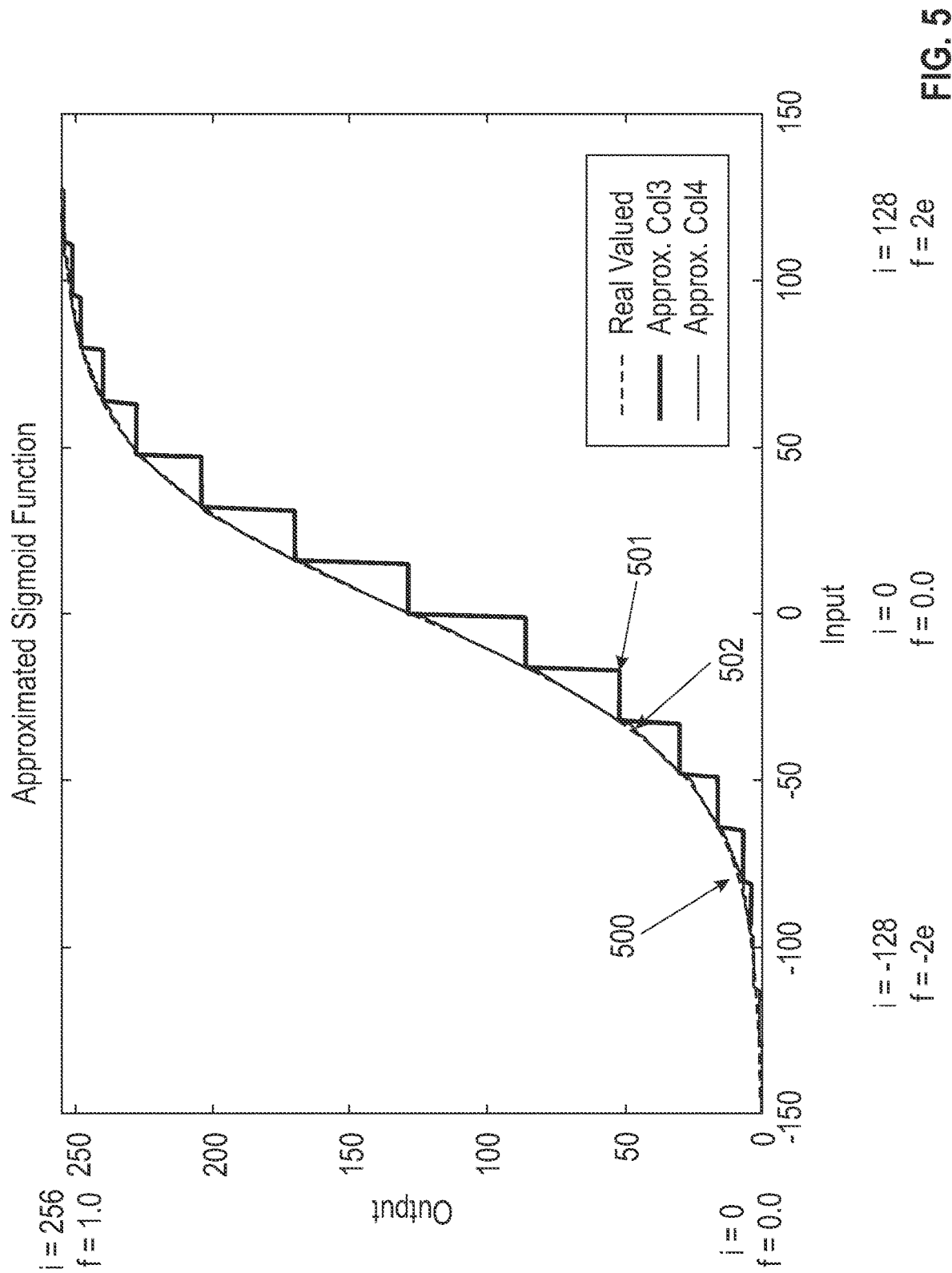
FIG. 5 is an exemplary graph of a sigmoid function with 4-bit Look Up Table (LUT) and 4-bit Multidimensional Look Up Table (MULT) according to embodiments of the present disclosure.
Figure 6:
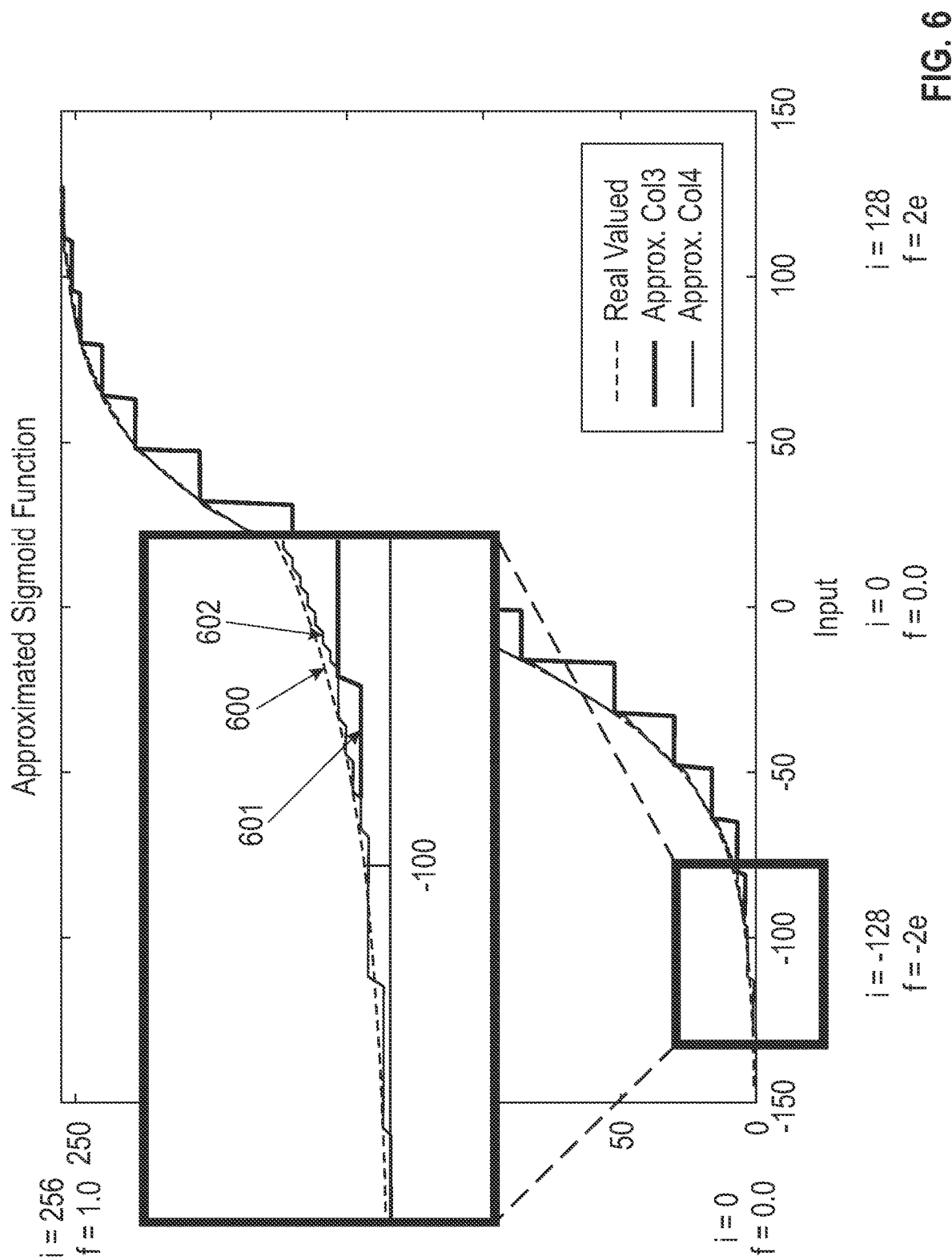
FIG. 6 illustrates an enlarged view of a first section of the graph of FIG. 5.
Figure 7:
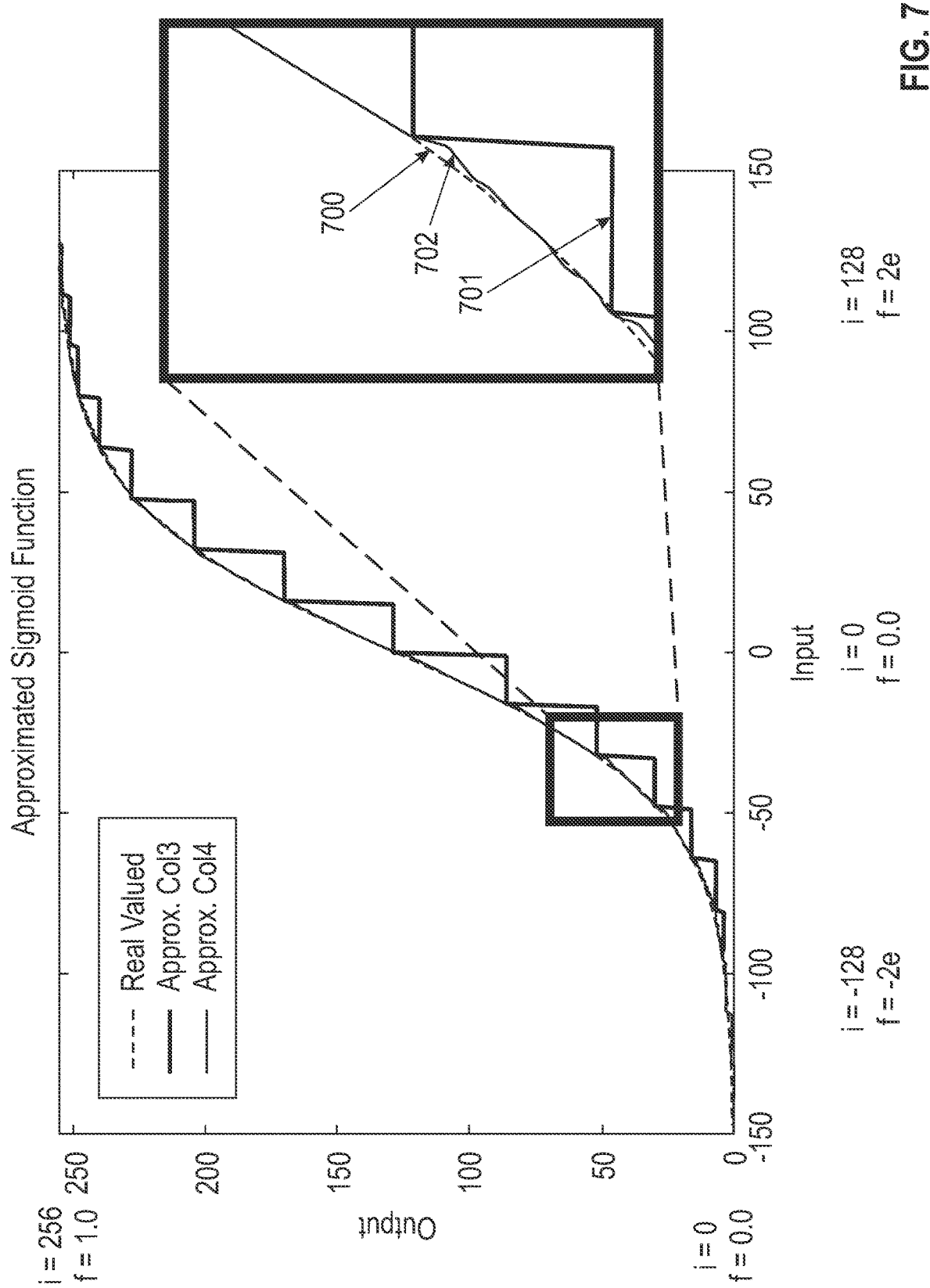
FIG. 7 illustrates an enlarged view of a second section of the graph of FIG. 5.

Referring to FIG. 5, an exemplary plot of the approximated sigmoid function is depicted, with the x-axis indicating input and the y-axis indicating output. The plot depicted includes the real value indicated by line 500, a first approximate value indicated by line 501 and a second approximate value indicated by line 502. FIG. 6 shows an enlarged, or zoom-in, view of a portion of the plot at location where the x-axis input equals approximately −100, with real value indicated by line 600, a first approximate value indicated by line 601 and a second approximate value indicated by line 602. FIG. 7 shows an enlarged, or zoom-in, view of a portion of the plot at location where the x-axis input equals approximately −40, with real value indicated by line 700, a first approximate value indicated by line 701 and a second approximate value indicated by line 702. As shown, the second approximation more closely reflects the real value.

Figure 8:
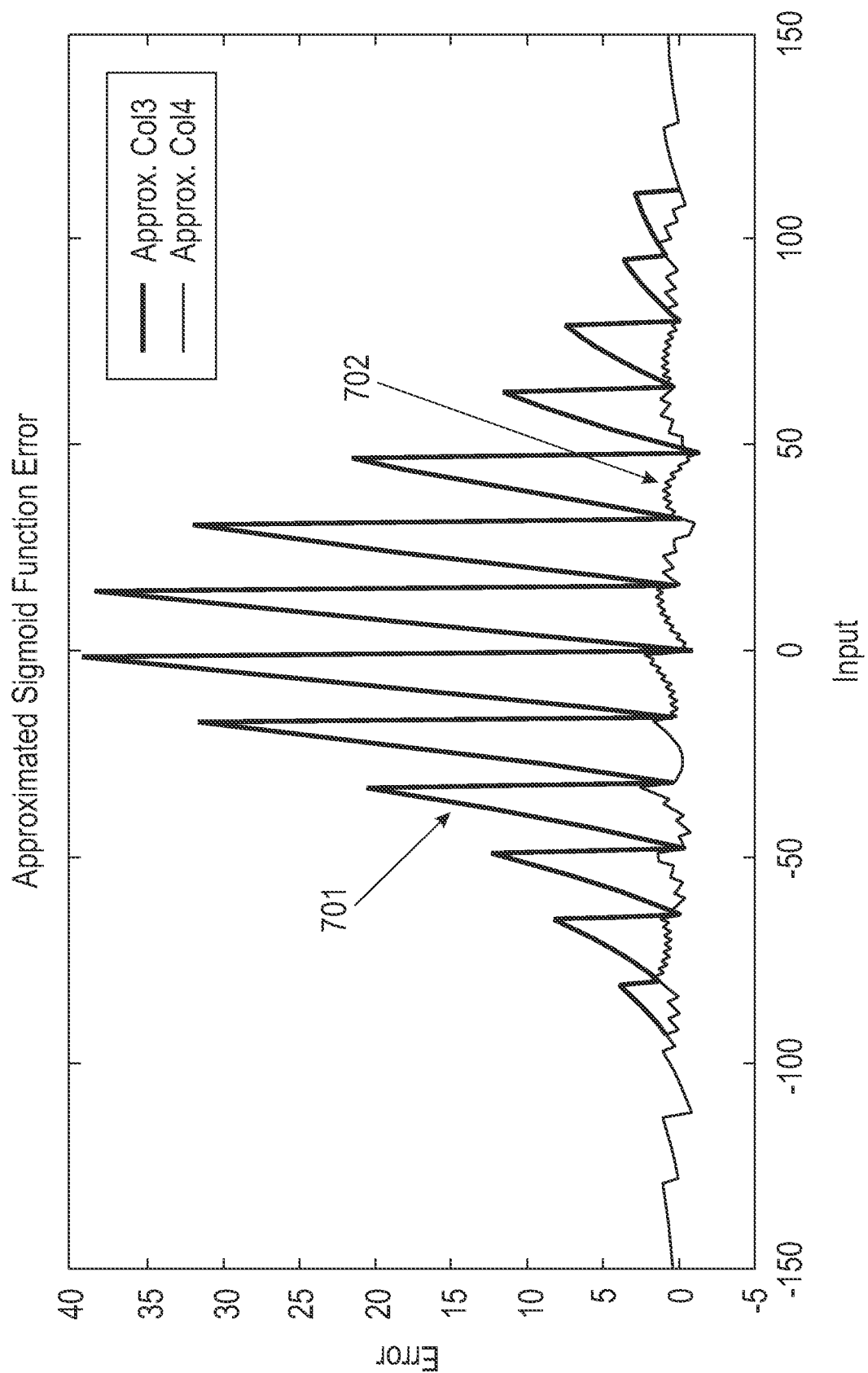
FIG. 8 illustrates an exemplary memory controller with a two-dimensional weight memory array according to embodiments of the present disclosure.

Referring to FIG. 8, an exemplary plot of the approximated sigmoid function error for the first approximation 801 and the second approximation 802. Provided in Tables 1 and 2 below are exemplary code blocks for the sigmoid function disclosed herein:

TABLE 1

```
static const size_t precision = 8;
static const size_t lut_bits_ = 4;
static const size_t coeff_bits_ = precision − lut_bits_;
static const size_t lut_size = 1 << lut_bits_;
static const size_t lut_area = 1 << coeff_bits_;
static const int32_t lut_range_min_ = −128;
static const int32_t lut_range_max_ = 128;
static const int32_t min_value_ = 0;
static const int32_t max_value_ = (1 << precision) − 1;
```

TABLE 2

```
int32_t SigmoidExtrapolate::calc(int32_t i){
    int32_t lut_idx_mask = ((~(~0 << lut_bits_)) << coeff_bits_);
    int32 t coeff mask = ~(~0 << coeff_bits_);
```

TABLE 2-continued

```
if(i < lut_range_min_) return min_value_;
if(lut_range_max_ <= i) return max_value_;
int32_t i_shifted = i - lut_range_min_;
int32_t lut_idx = (i_shifted & lut_idx_mask) >>
  coeff_bits_; // u[7:4]
int32_t coeff = i_shifted & coeff_mask; // u[3:0]
return ((y_LUT_[lut_idx] << 2) +
  coeff_LUT_[lut_idx]*coeff) >> 2;
```

Figure 9:
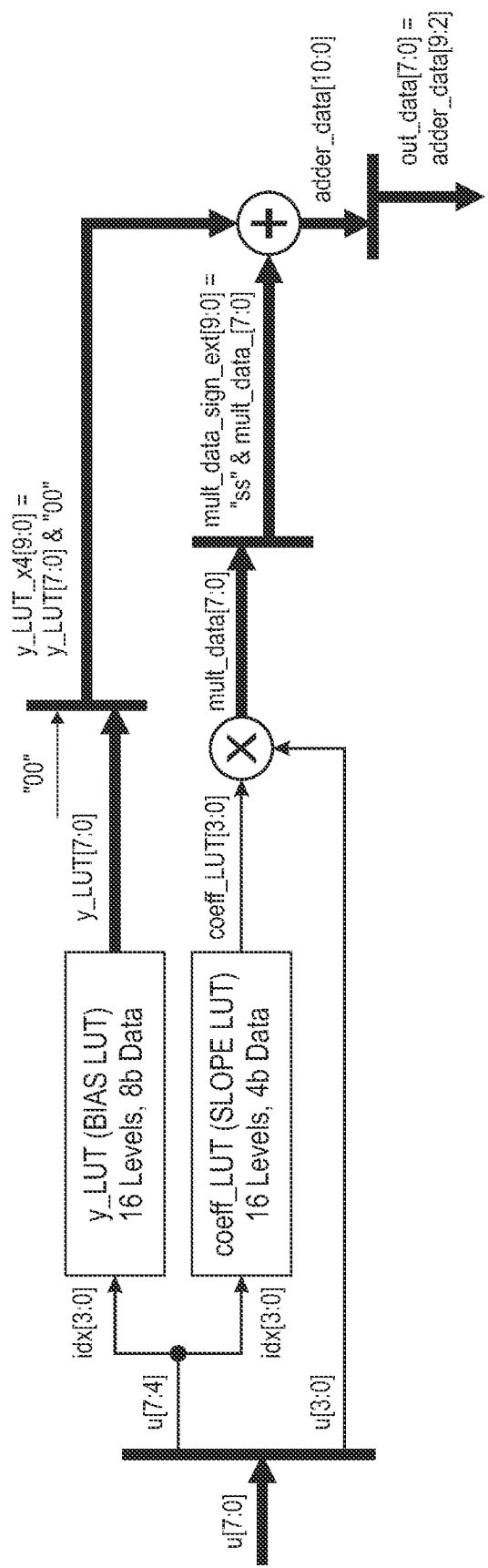
FIG. 9 illustrates an exemplary code block and block diagram of a sigmoid function according to embodiments of the present disclosure.

Referring to FIG. 9, an exemplary block diagram is depicted for the sigmoid function set forth in Table 2 above. In some embodiments, if Look Up Tables are programmed appropriately in accordance with the present disclosure, adder overflow can be avoided, and the range of adder_data is 9:0.

Figure 10A:
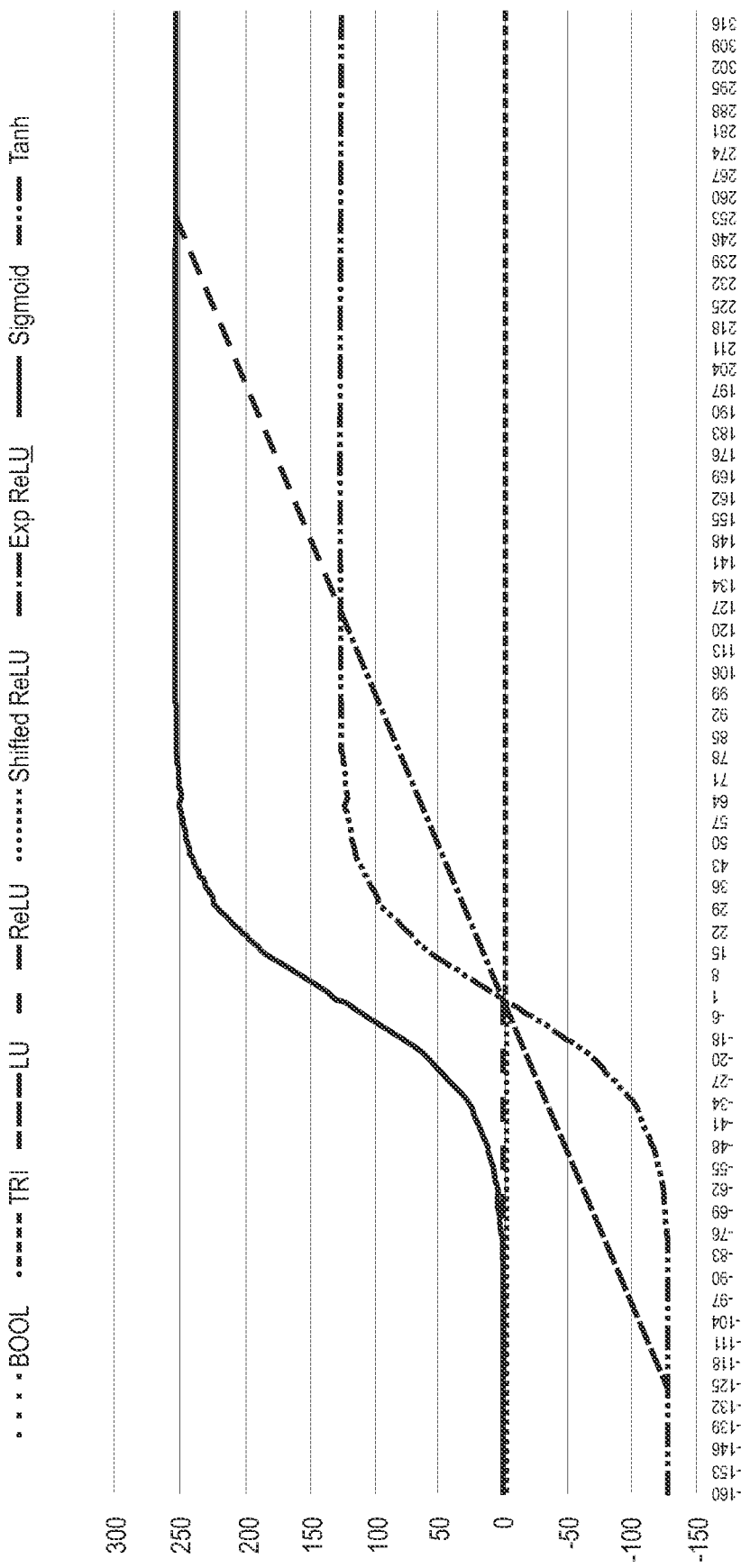
FIG. 10A illustrates exemplary functions using an 8-bit implementation according to embodiments of the present disclosure.
Figure 10B:
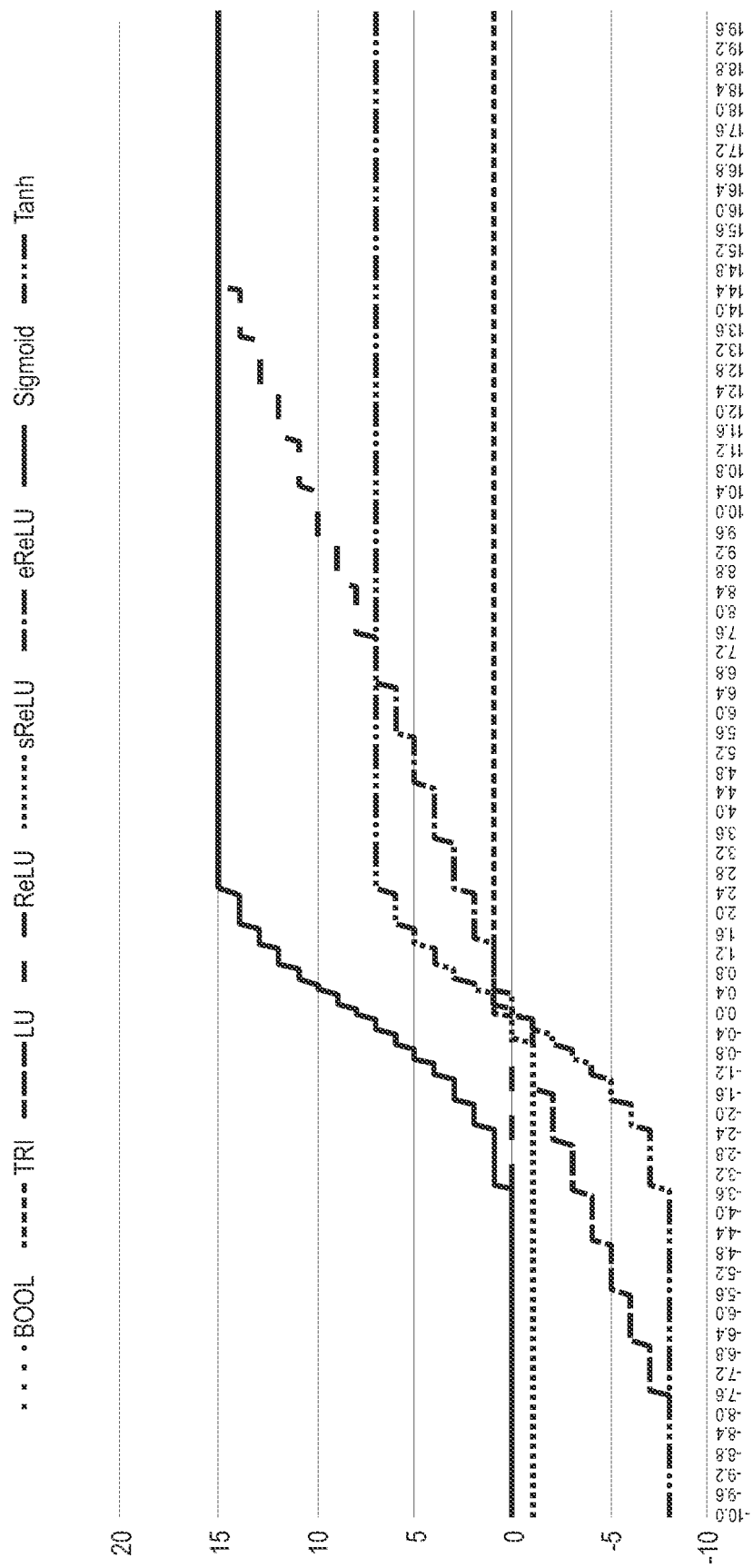
FIG. 10B illustrates exemplary functions using a 4-bit implementation according to embodiments of the present disclosure.
Figure 10C:
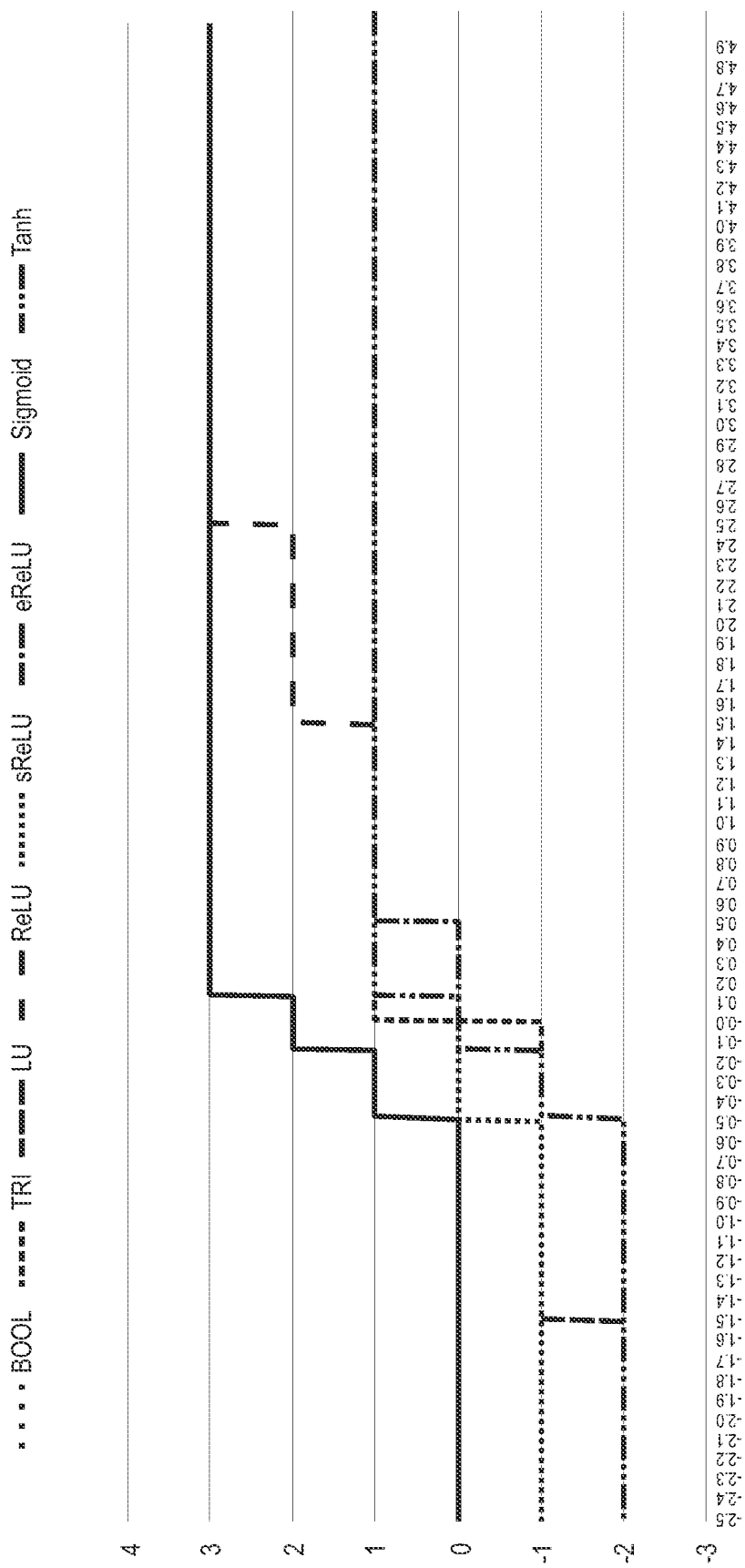
FIG. 10C illustrates exemplary functions using a 2-bit implementation according to embodiments of the present disclosure.

FIG. 10A illustrates exemplary functions using an 8-bit implementation, FIG. 10B illustrates exemplary functions using a 4-bit implementation, and FIG. 10C illustrates exemplary functions using a 2-bit implementation. In each of FIGS. 10A-10C, exemplary functions for BOOL, TRI, LU, ReLU, Shifted ReLU (sReLU), Exp ReLU (eReLU), sigmoid, and tanh are illustrated in graphical form. As shown in FIG. 10A, the 8-bit functions illustrate smooth (e.g., continuous) functions across a range of input values. As shown in FIG. 10B, the 4-bit functions illustrate step-wise approximations of the functions of FIG. 10A across a range of input values. As shown in FIG. 10C, the 2-bit functions illustrate step-wise approximations of the functions of FIG. 10A across a range of input values. As shown in FIG. 10C, the individual steps are larger than the steps of FIG. 10B (i.e., the functions shown in FIG. 10C are less-accurate step function approximations of the functions of FIG. 10A compared to the functions shown in FIG. 10B).

Figure 11:
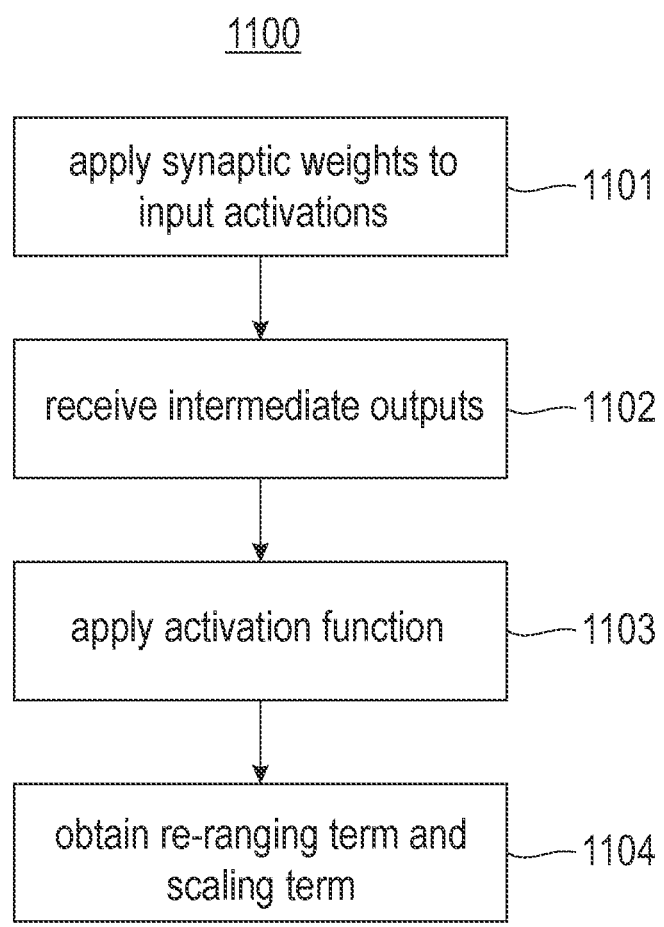
FIG. 11 illustrates a method for computing neural activations according to embodiments of the present disclosure.

Referring to FIG. 11, a method for computing neural activations is illustrated. At 1101, a plurality of synaptic weights is applied to a plurality of input activations to produce a plurality of intermediate outputs. At 1102, the plurality of intermediate outputs is received and a plurality of activations is produced therefrom. Producing the plurality of activations comprises: at 1103, applying a configurable activation function to the intermediate outputs, the configurable activation function having at least a re-ranging term and a scaling term, the re-ranging term determining the range of the activations and the scaling term determining the scale of the activations, and at 1104, obtaining the re-ranging term and the scaling term from one or more look up tables.

Various embodiments of the present disclosure use combinations of instruction buffers, horizontal buffers, vertical buffers, and layover buffers to provide instruction and data distribution in one or two dimensional memory arrays. It will be appreciated that the present disclosure is applicable to higher dimensional arrays with the addition of additional buffers. In these embodiments, the time from instruction issuance to data output from the data array is constant, even though each phase may take different amounts of time. Columns may be accessed in a random order. In cases with higher than one dimension, two instructions that access the same column should be separated by a vertical distribution time. In the one dimensional case, the vertical distribution time is zero, so there is no constraint.

In various embodiments, a system is provided that includes a memory array, instruction buffers, and horizontal data buffers. The sum of the number of cycles for instruction distribution and for memory distribution is constant for all instructions.

In various embodiments, a two-dimensional memory array is provided. Horizontal buffers are provided for each row of the memory array. Vertical buffers are provided for each column of the memory array. The sum of the number of cycles for instruction distribution, for the data distribution along the vertical buffers and for data distribution along the horizontal buffers is constant.

In various embodiments, a two-dimensional memory array is provided. Layover buffers are provided for each position in the memory array. The sum of the number of cycles for instruction distribution, for the data distribution along the vertical buffers, for data distribution along the horizontal buffers, and for data transit of the layover buffers is constant.

Figure 12:
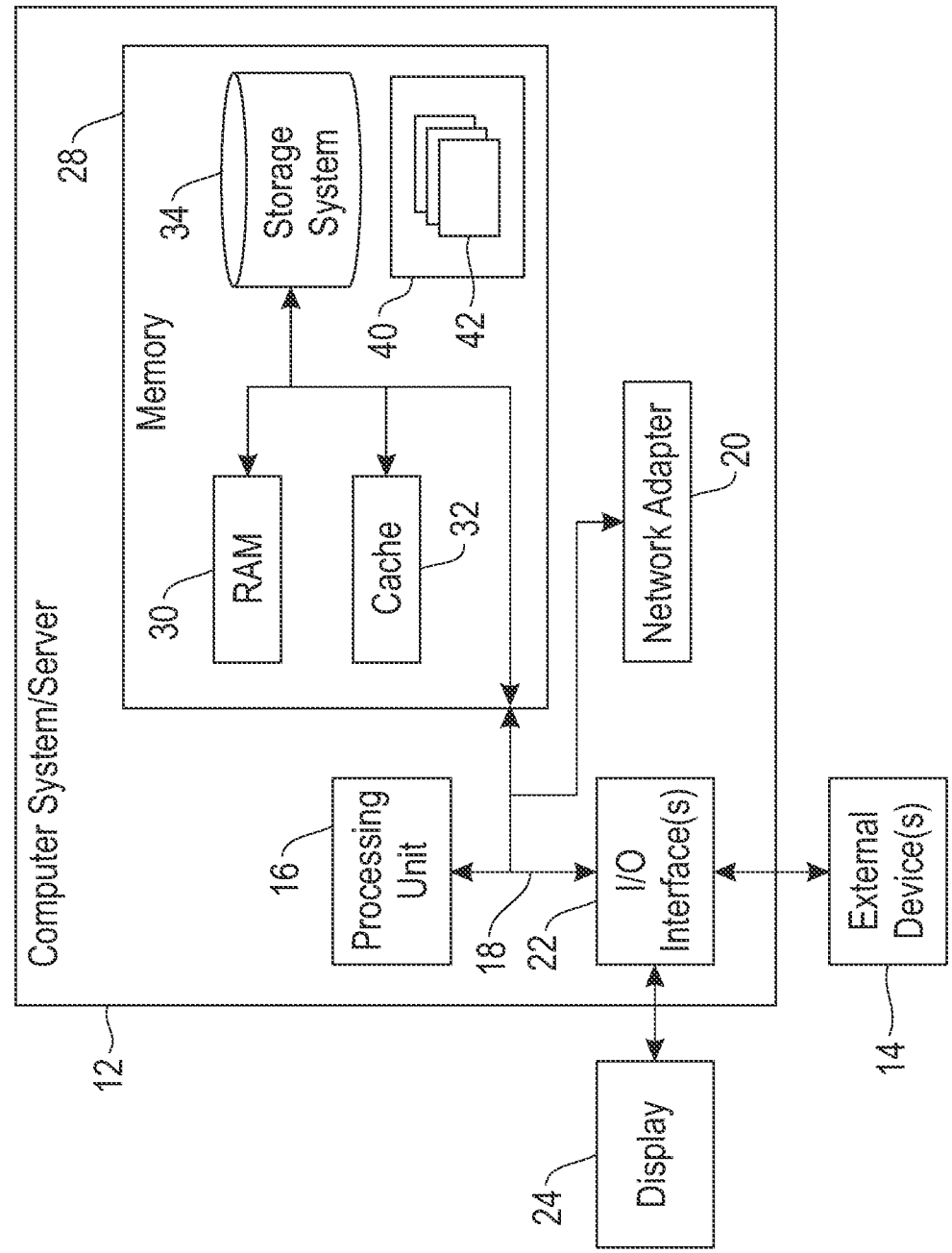
FIG. 12 depicts a computing node according to an embodiment of the present disclosure.

Referring now to FIG. 12, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip comprising:
at least one neural inference core adapted to apply a plurality of synaptic weights to a plurality of input data tensors to produce a plurality of intermediate output data tensors,
the at least one neural inference core comprising a plurality of activation units configured to receive the plurality of intermediate output data tensors and produce a plurality of activations,
each of the plurality of activation units being configured to apply a configurable activation function to its input data tensor,
the configurable activation function having at least a re-ranging term and a scaling term, the re-ranging term applying a bias that determines a range of the plurality of activations and the scaling term applying a slope that determines a scale of the plurality of activations, wherein the re-ranging term and the scaling term are obtained separately from predetermined sets, each predetermined set being associated with one of the re-ranging term or the scaling term,
each of the plurality of activations units obtaining the re-ranging term and the scaling term from one or more look up tables.

2. The neural inference chip of claim 1, wherein the plurality of activations have flexible precision.

3. The neural inference chip of claim 1, wherein the plurality of activations have a floating point value.

4. The neural inference chip of claim 1, wherein the plurality of input data tensors have 16-bit precision.

5. The neural inference chip of claim 1, wherein the plurality of input data tensors have 32-bit precision.

6. The neural inference chip of claim 1, wherein each predetermined set is a lookup table.

7. The neural inference chip of claim 1, wherein each of the re-ranging term and the scaling term are learned.

8. The neural inference chip of claim 1, wherein the configurable activation function is selected from a list consisting of: Boolean, trinary, linear, ReLU, shifted ReLU, ExpReLU, sigmoid, and tanh.

9. An integrated circuit, comprising:
at least one neural inference core, adapted to apply a plurality of synaptic weights to a plurality of input data tensors to produce a plurality of intermediate output data tensors,
the at least one neural inference core comprising a plurality of activation units configured to receive the plurality of intermediate output data tensors and produce a plurality of activations,
each of the plurality of activation units being configured to apply an activation function to its input data tensor, the activation function being Boolean, trinary, linear, ReLU, shifted ReLU, ExpReLU, sigmoid, or tanh,
the activation function having at least a re-ranging term and a scaling term, the re-ranging term applying a bias that determines a range of the plurality of activations and the scaling term applying a slope that determines a scale of the plurality of activations, each of the re-ranging term and the scaling term having an associated lookup table,
each of the plurality of activations units obtaining the re-ranging term and the scaling term separately from the associated lookup tables.

10. A computer-implemented method, comprising:
applying a plurality of synaptic weights to a plurality of input data tensors to produce a plurality of intermediate output data tensors;
receiving the plurality of intermediate output data tensors and produce therefrom a plurality of activations, wherein producing the plurality of activations comprises:
applying a configurable activation function to the plurality of intermediate output data tensors, the configurable activation function having at least a re-ranging term and a scaling term, the re-ranging term applying a bias that determines a range of the plurality of activations and the scaling term applying a slope that determines a scale of the plurality of activations, each of the re-ranging term and the scaling term having an associated lookup table, and obtaining the re-ranging term and the scaling term separately from the associated lookup tables.

11. The method of claim 10, wherein the plurality of activations have flexible precision.

12. The method of claim 10, wherein the plurality of activations have a floating point value.

13. The method of claim 10, wherein the plurality of input data tensors have 16-bit precision.

14. The method of claim 10, wherein the plurality of input data tensors have 32-bit precision.

15. The method of claim 10, wherein each of the re-ranging term and the scaling term have one associated lookup table.

16. The method of claim 10, wherein each of the re-ranging term and the scaling term are learned.

17. The method of claim 10, wherein the configurable activation function is selected from a list consisting of: Boolean, trinary, linear, ReLU, shifted ReLU, ExpReLU, sigmoid, and tanh.

* * * * *